(12) United States Patent
Cirelli et al.

(10) Patent No.: US 6,906,846 B2
(45) Date of Patent: Jun. 14, 2005

(54) MICRO-ELECTRO-MECHANICAL SYSTEM DEVICE AND METHOD OF MAKING SAME

(75) Inventors: Raymond A. Cirelli, Hillsborough, NJ (US); James A. Liddle, Walnut Creek, CA (US); Michael P. Schlax, Davenport, IA (US)

(73) Assignees: Triquint Technology Holding Co., Hillsboro, OR (US); Agere Systems, Inc., Allentown, PA (US)

( * ) Notice: Subject to any disclaimer, the term of this patent is extended or adjusted under 35 U.S.C. 154(b) by 93 days.

(21) Appl. No.: 10/217,609

(22) Filed: Aug. 14, 2002

(65) Prior Publication Data

US 2004/0032639 A1 Feb. 19, 2004

(51) Int. Cl.[7] .......................... G02B 26/00; G02B 26/02; G02B 5/08
(52) U.S. Cl. .......................... 359/291; 359/290; 359/224; 359/850; 359/295; 345/84; 438/52; 438/66; 310/306
(58) Field of Search .................. 359/290, 291, 359/295, 221, 223, 224, 214, 230, 846, 850; 73/704; 438/28, 52, 66; 345/84; 310/306, 309, 328

(56) References Cited

U.S. PATENT DOCUMENTS

| | | | | |
|---|---|---|---|---|
| 5,604,623 A | * | 2/1997 | Ji et al. ...................... 359/224 |
| 5,677,785 A | * | 10/1997 | Koo et al. ................... 359/291 |
| 5,786,928 A | * | 7/1998 | Nam et al. ................... 359/295 |
| 5,859,724 A | * | 1/1999 | Nam .......................... 359/295 |
| 5,861,979 A | * | 1/1999 | Ji et al. ...................... 359/291 |
| 6,201,629 B1 | | 3/2001 | McClelland et al. |
| 6,201,631 B1 | | 3/2001 | Greywall |
| 6,535,318 B1 | * | 3/2003 | Wood et al. ................ 359/224 |
| 6,556,334 B2 | * | 4/2003 | Lee ........................... 359/230 |
| 6,560,002 B2 | * | 5/2003 | Mori ......................... 359/247 |
| 6,743,656 B2 | * | 6/2004 | Orcutt et al. ................. 438/66 |

* cited by examiner

*Primary Examiner*—Loha Ben
(74) *Attorney, Agent, or Firm*—Dickstein Shapiro Morin & Oshinsky LLP (57) ABSTRACT

A MEMS device and a method for making a MEMS device are described. The MEMS device includes a support member, an optical device, and a flexible member. In one aspect, the flexible member is formed separately from the support member and the optical device. In one aspect, the flexible member is dimensioned to enable flex in one direction while maintaining stiffness in two orthogonal directions. In one fabrication embodiment, the MEMS device is formed by etching an opening into the structural layer to create a structural support member and an optical device. The structural support member and optical device are mounted on a support substrate with a sacrificial layer. A flexible member is conformally deposited over the structural support member and the optical device and then etched. The sacrificial layer is partially etched away to leave the structural support member anchored to the support substrate.

23 Claims, 7 Drawing Sheets

MICRO-ELECTRO-MECHANICAL SYSTEM DEVICE AND METHOD OF MAKING SAME

FIELD OF THE INVENTION

The present invention is generally directed to micro-electro-mechanical system (MEMS) devices, and more particularly to a MEMS device with a flexure member and a method for making such a MEMS device.

BACKGROUND

Occasions arise when devices are manufactured that contain surfaces whose shapes must be accurately controlled to maintain a necessary level of optical performance. Optical MEMS devices are one such device. For example, in an optical cross-connect design, a reflecting mirror must stay flat to suppress any disturbance to the focusing/collimating action of the lens system. Typically, the material which is utilized to fabricate the structural portion of the optical surface does not possess the required optical properties, and thus coatings generally must be applied to the optical surface. The coatings are frequently stressed, which can cause the optical surface to deform, resulting in a loss of performance.

Figure 1:
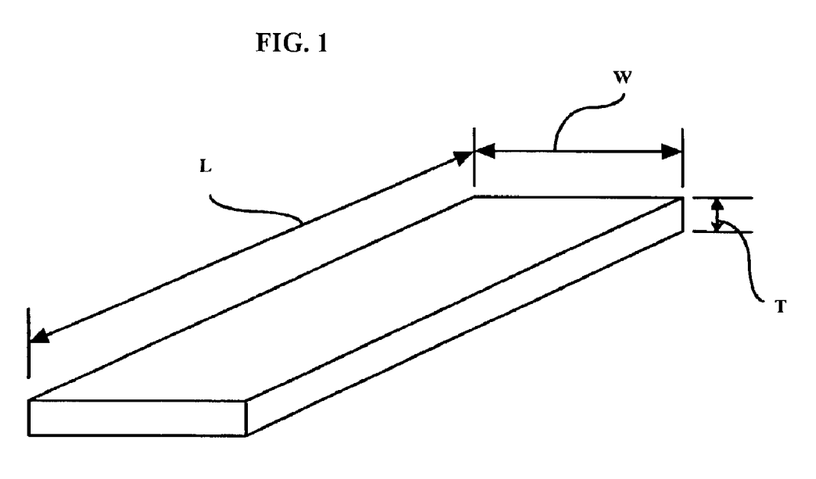
FIG. 1 illustrates the dimensions of a generic spring device.

To inhibit this effect, it is desirable to make the structural portion of the optical surface as stiff as possible. Usually, greater stiffness is achieved by making the structural portion thicker. However, making the structural portion thicker leads to disadvantages when such a device is employed. FIG. 1 illustrates the dimensions (length, width, thickness) of a generic spring.

Figure 2:
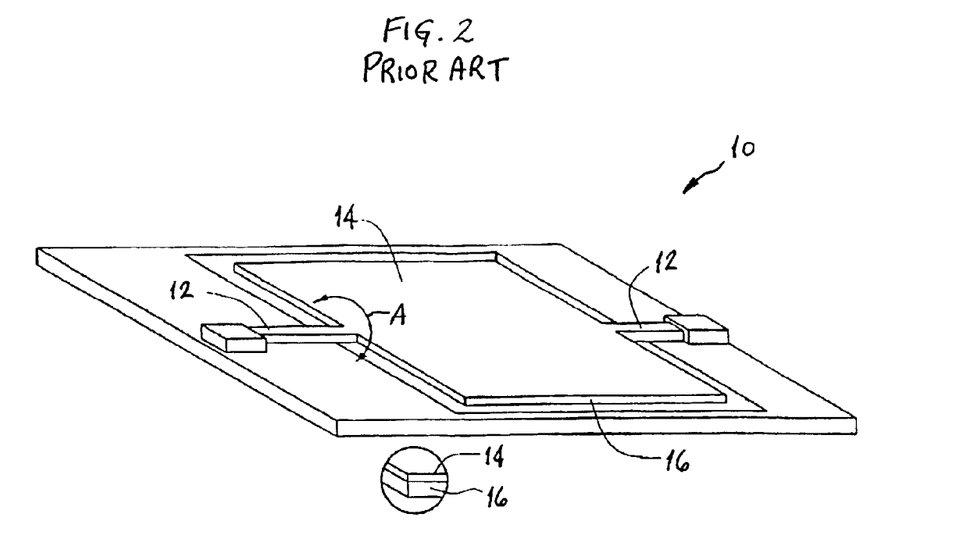
FIG. 2 is a perspective view of a conventional MEMS device.

In known optical MEMS devices, the same layer of material used to form the optical surface is also used to fabricate a flexure structure. The flexure structure is generally utilized to connect an optical device, such as a mirror, with a support structure. For example, FIG. 2 illustrates a known MEMS device 10 including a flexure structure 12 formed from the same layer of material used to form the optical surface 14 of an optical device 16.

A flexure structure, such as flexure structure 12, allows the optical layer 14 of the optical device 16 to rotate in a direction A when the MEMS device 10 is actuated. Generally, electrostatic force is used to actuate MEMS devices. It is desired to fabricate the MEMS device 10 in such a way as to limit the amount of electrostatic force needed to actuate the device. The amount of actuating force necessary is that which can overcome the stiffness of the flexure structure 12. Thus, it is known to make the flexure structure 12 relatively compliant. It is further known that a large degree of control over the compliance of the flexure structure 12 is needed to optimize the MEMS device 10 design.

Highly compliant flexure structures can be fabricated by reducing at least one dimension of the flexure structure. For example, in the instance where the flexure structure is fabricated from the same layer of material as the optical structure, such as the flexure structure 12, the only dimension which is reducible is the width. Making narrow but deep, i.e., high aspect ratio, structures, however, presents a processing challenge and tends to put a constraint on the thickness T (FIG. 1) of the optical layer 14. Making the flexure structure 12 more compliant by extending its length L (FIG. 1) encounters other problems, such as requiring a great amount of space and could lead to undesirable deflection modes.

Thus, the design requirements for the optical surfaces of known optical devices, which should be made as stiff as possible, are in conflict with those for flexure structures, which should be made as compliant as possible.

Figure 3:
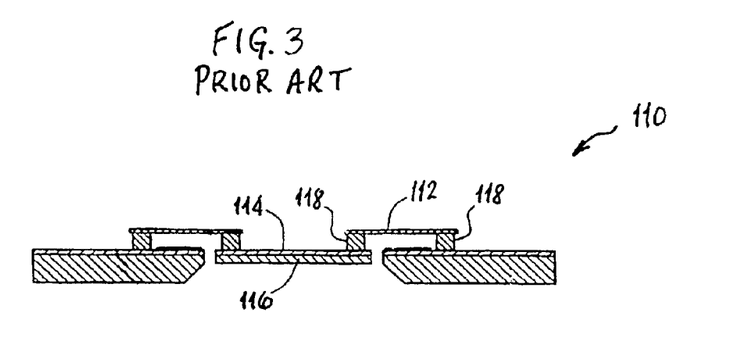
FIG. 3 is a cross-sectional view of another conventional MEMS device.

As shown in FIG. 3, another MEMS device 110 is shown including a flexure structure 112 out of plane with an optical surface 114 of an optical device 116. The flexure structure 112 is out of plane with the optical surface 114 by virtue of being mounted on posts 118. Further, such a design, as described in U.S. Pat. No. 6,201,629 (McClelland et al.), is one in which the flexure structure 112, and not the optical device 116, is configured to be actuated.

Conventionally, one way of fabricating a MEMS device involved fabricating the flexible layer and the mirror on one chip and the driver electronics on another chip and flip chip bonding the two chips together. The use of flip chip bonding has disadvantages. For example, alignment is not as accurate as fabricating the MEMS device from one wafer. Further, flip chip bonding adds an extra complicated, and hence expensive, step to the fabrication process which adds to fabrication costs and often leads to decreases in yield.

There exists a need for devices having a flexure structure whose dimensions can be decoupled from the dimensions of other components of the optical device. There further exists a need for a MEMS optical device which is fabricated from two different materials planarly aligned and which does not require complicated flip chip bonding.

SUMMARY

The invention provides a MEMS device that includes a support member, an optical device adapted to be electrostatically actuated and having an optical device support layer, and a member dimensioned to be flexible and interconnecting the support member and the optical device support layer. The member is formed separately from the optical device support layer.

The invention further provides a MEMS device that has a support substrate, a structural support layer, and an optical device adapted to be electrostatically actuated and having a support layer. The support layer and the structural support layer are integrally formed of the same material and are deposited over the support substrate.

The invention further provides a method for fabricating a MEMS device that includes forming a support member, forming an optical device separated from said support member and having a support layer, and forming a member which is dimensioned to be flexible and which interconnects the support member and the optical device support layer. The member is formed separately from the optical device support layer.

The invention also provides a method for fabricating a MEMS device that includes forming a support substrate, forming a structural support layer, and forming an optical device adapted to be electrostatically actuated and having a support layer. The support layer and the structural support layer are integrally formed of the same material and are deposited over the support substrate.

The foregoing and other advantages and features of the invention will be more readily understood from the following detailed description of the invention, which is provided in connection with the accompanying drawings.

DETAILED DESCRIPTION OF PREFERRED EMBODIMENTS

Figure 4:
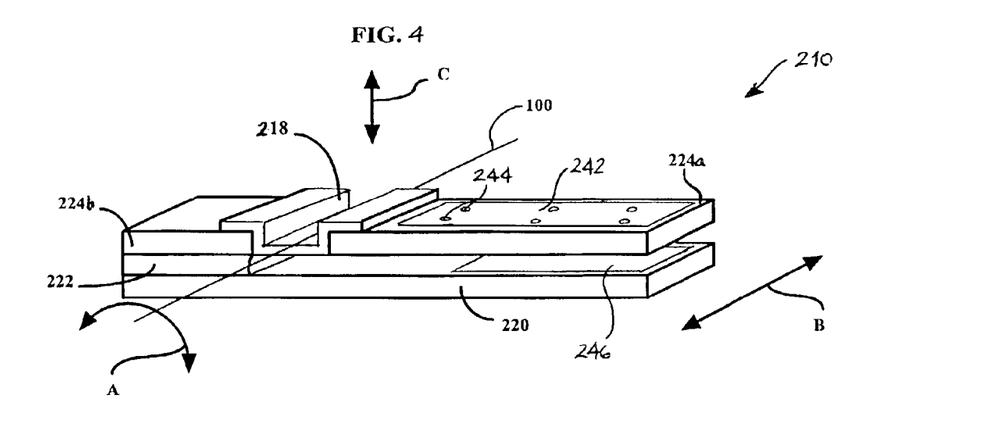
FIG. 4 is a perspective view of a MEMS device constructed in accordance with an embodiment of the invention.

It should be appreciated that while the invention is described herein in relation to an optical MEMS device, the invention is applicable to all devices in which structural and flexibility constraints are at odds with each other. As illustrated in FIG. 4, a MEMS device 210 according to an exemplary embodiment of the invention includes a free-standing support layer 224a in flexible attachment with a structural support layer 224b. The free-standing support layer 224a includes a mirror 242. Instead of a mirror 242, another optical device may be utilized. The free-standing support layer 224a and the structural support layer 224b are flexibly attached to one another through a flexible layer 218. The flexible layer 218 is attached to respective surfaces of and extends over opposing ends of the free-standing support layer 224a and the structural support layer 224b.

The flexible layer 218 is dimensioned in such a way as to enable flex of the flexible layer 218 in the direction A about an axis of rotation 100. Further, the flexible layer 218 is dimensioned in such a way as to enable stiffness with respect to motion in directions B and C. Suitable materials which may be used to form the flexible layer 218 include polysilicon, silicon nitride, titanium nitride, silicon carbide, metallic film, diamond, diamond-like carbon, or other materials suitable in the fabrication of MEMS devices. Additionally, the flexible layer 218 extends partially over the free-standing support layer 224a and the structural support layer 224b and flexes at a location which is within the same plane as the free-standing support layer 224a and the structural support layer 224b.

Introducing a flexible layer 218, which is separate from the free-standing support layer 224a and the structural support layer 224b makes possible the optimization of the design of the MEMS device 210. Through the use of patterning and deposition, precise control may be maintained regarding the thickness of the flexible layer 218. Compliance of the component made from the material is generally controlled by its minimum dimension, and so heightened control over the thickness of the flexible layer 218 allows greater control over its compliance.

The stiffness of a flexible layer, which acts as a spring, may be described mathematically. For example, the stiffness of a torsion, or twisting, spring $k_{torsion}$ is described by Equation 1 below:

$$k_{torsion}=ab^3[16/3-3.36(b/a)(1-(b^4/12a^4))](G/L)$$

where a represents the greater dimension (be it width or thickness), b represents the lesser dimension, G represents the shear modulus of the spring, and L represents the length of the spring. Equation 1 shows that the $k_{torsion}$ is proportional to the first order to the cube of the smaller dimension b of the flexible layer. The stiffness of a flexible layer, with a concentrated load on its free end as a cantilever spring, is described by Equation 2 below:

$$k_{bending}=Ecd^3/4L^3$$

where d is the thickness of the flexible layer and c is either width or length, depending upon the direction of the bending plane. In both equations, the stiffness of the flexible layer is proportional to the smaller dimension (b or d) cubed of the flexible layer while only being linearly related to the larger dimension (a or c) of the flexible layer. For example, the deposition of the flexible layer 218 at a uniform thickness T (FIG. 1) of 0.1 micrometer provides such a flexible layer with approximately 6.5 percent of the stiffness of a flexible layer having a thickness T (FIG. 1) of 0.25 micrometers and a similar width W (FIG. 1). Typical semiconductor processing can pattern and etch a flexible layer to a width W (FIG. 1) of 0.25 micrometer, whereas depositing flexible layers as separate films can easily produce a uniform thickness T (FIG. 1) of 0.05 micrometer.

In addition to the stiffness achieved in a spring due to torsion and/or bending, stiffness may also be achieved through stretching. By exerting a force in a direction that creates a piston-type motion in a spring, a certain degree of stiffness may be achieved. By depositing a structural layer separate from an optical layer, the stiffness achieved can be adjusted to be at a desired level.

The flexible layer 218 may be a thin material, on the order of about 50 nanometers thick or thicker. It is desired that the flexible layer 218 not be as thick as the free-standing support layer 224a and the structural support layer 224b. The upper limit of the thickness dimension T (FIG. 1) of the flexible layer 218 is dependent upon the desired width W (FIG. 1) of the flexible layer. Through use of the invention, a spring may be manufactured with a decreased thickness T and a greater width W with very little or no change in the stiffness than springs manufactured via conventional methods described in the Background. For example, to obtain a flexible layer 218 having a width W twice that of a conventionally formed flexible layer, one can reduce the thickness T to be eighty percent of the thickness T of the conventionally formed flexible layer. The thinness of the flexible layer 218 allows high levels of compliance in a desired direction, in this instance the direction A, while maintaining stiffness to motion in other directions, namely directions B and C.

Figure 5:
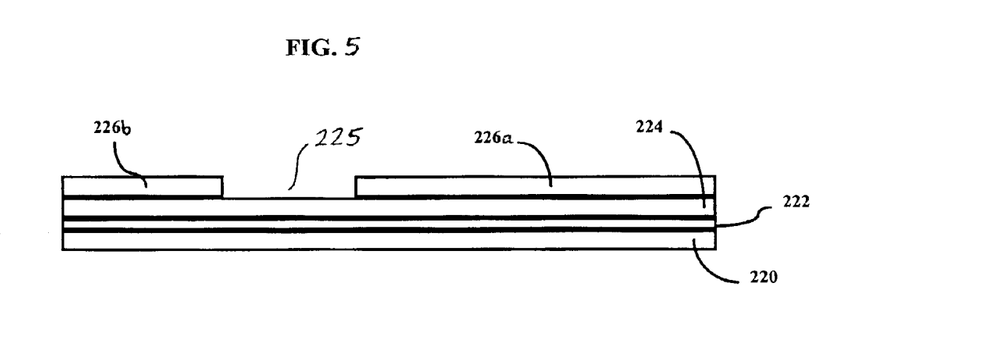
FIGS. 5–10 are side views illustrating the fabrication of the MEMS device of FIG. 4.
Figure 10:
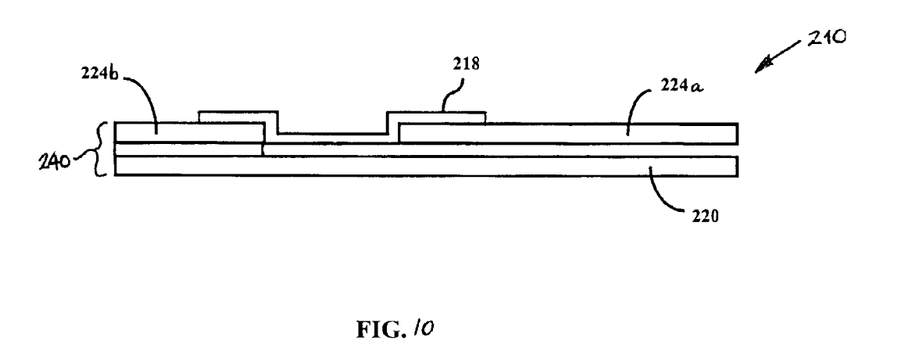
Figure 11:
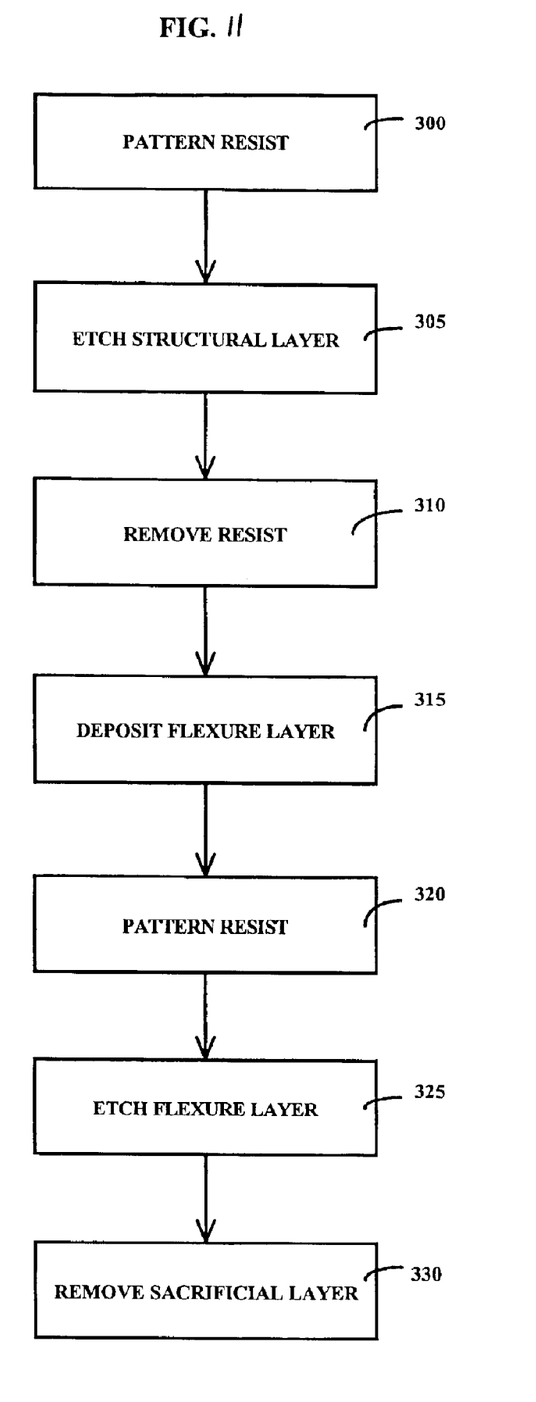
FIG. 11 illustrates method steps for fabricating a MEMS device in accordance with an embodiment of the invention.

FIG. 11 illustrates a method for fabricating the MEMS device of FIG. 4 while FIGS. 5–10 illustrate the fabricated structure during various stages of fabrication. Referring to FIGS. 4 and 5, a support substrate 220, formed from a silicon wafer, serves as a base. Driver electronics 246 are schematically shown in FIG. 4 as fabricated on a surface of the support substrate 220. It should be appreciated that the driver electronics 246 may be positioned elsewhere, and that only the electrodes of the driver electronics 246 need be positioned on the support substrate 220. Actuating the driver electronics 246 electrostatically actuates the mirror 242 and causes an attractive force between the mirror 242 (FIG. 4) and the driver electronics 246, leading to bending of the flexible layer 218 about the axis of rotation 100.

After the support substrate 220 is fabricated with the driver electronics 246, the support substrate 220 is overlain with an intermediate sacrificial layer 222. The sacrificial layer 222 may be formed of an oxide. A silicon-on-insulator structure is formed by depositing a polysilicon layer 224 over the sacrificial layer 222. It is to be appreciated that instead of a silicon wafer, quartz or a polymer material may be utilized for the support substrate 220 instead. In such a situation, the driver electronics 246 may be located elsewhere (with only the electrodes on the support substrate 220), or an extra layer of silicon or other semiconductor material will be required over the quartz or polymer support substrate 220 to allow location of the driver electronics 246 thereon. Further, the support substrate 220 and the polysilicon layer 224 may be formed of any materials which may be differentiated from the sacrificial layer 222 through etching. The polysilicon layer 224 serves as a structural support layer for the MEMS device. A resist layer is then patterned on the structural support layer 224 in step 300 (FIG. 10). As illustrated in FIG. 4, the resist layer is patterned into resist layer portions 226a and 226b. An opening 225 separates the resist layer portions 226a and 226b.

Figure 6:
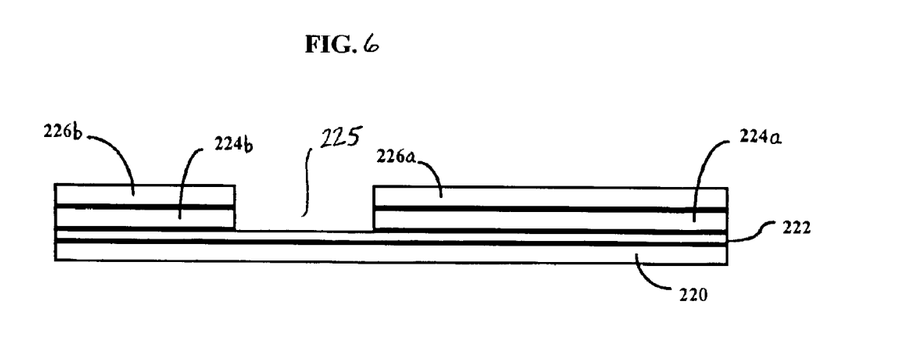
Figure 7:
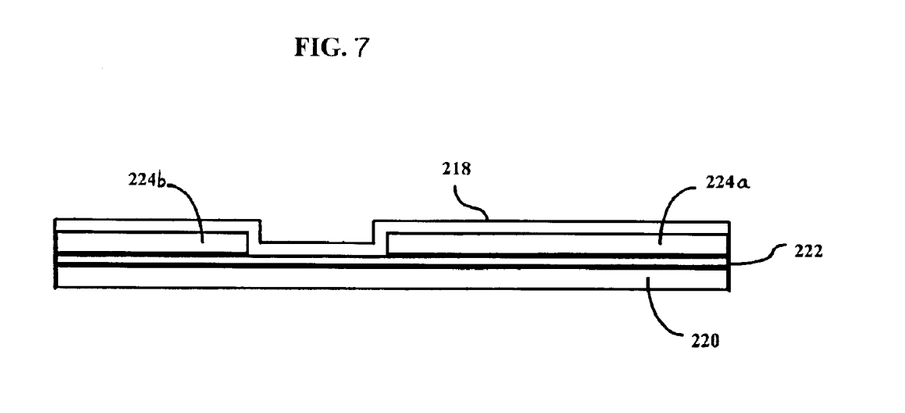
Figure 8:
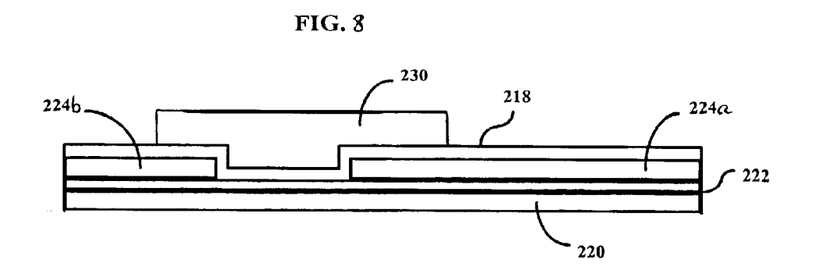
Figure 9:
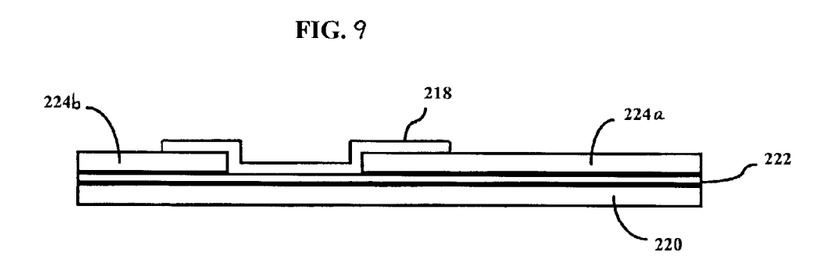

In step 305 (FIG. 11), the structural layer 224 is etched beneath the opening 225. Etching of the structural layer 224 separates the structural support layer 224 into structural support layer portions 224a and 224b separated by the opening 225 (FIG. 6). After etching of the structural layer 224, the resist layer portions 226a and 226b are removed at step 310. The exposed free-standing support layer 224a may be further processed to prepare it as a mirror 242 (FIG. 4). Such further processing may include applying a coating of aluminum or other suitable optical coating that serves as the mirror 242.

At step 315 (FIG. 11), a flexible layer 218 (FIG. 7), is deposited over the free-standing support layer 224a and the structural support layer 224b. The flexible layer 218 is conformally deposited over the surface of the free-standing support layer 224a and the structural support layer 224b and within the opening 225. A resist 230 (FIG. 8) is next patterned on the flexible layer 218 at step 320 (FIG. 11). The resist 230 is patterned over the opening 225 and laterally outside the area of the opening.

At step 325 (FIG. 11), the flexible layer 218 is etched. The resist 230 serves as a mask and protects the flexible layer 218 in and around the opening 225. After etching of the flexible layer 218, the resist 230 is removed. The sacrificial oxide layer 222 is then partially removed at step 330 (FIG. 11) such that a portion of layer 222 remains beneath the structural support layer 224b. One preferred way for removing the sacrificial layer 222 is subjecting it to a timed etch which removes a portion of the sacrificial layer 222 underlying the optical device 224a, leaving a portion of the sacrificial layer 222 in place beneath the structural support layer 224b. Holes 244 (FIG. 4) are provided through the free-standing support layer 224a to allow etchant to contact and etch the sacrificial layer 222 underneath. While the holes 244 are shown to extend through the mirror 242, the mirror 242 may instead be narrower and the holes 244 may instead be outside the outline of the mirror 242.

As illustrated in FIG. 10, a portion of the sacrificial layer 222 remains, mechanically grounding the structural support layer 224b to the support substrate 220 to form a support member 240, while the support layer 224a now cantilevers from the support member 240.

Figure 12:
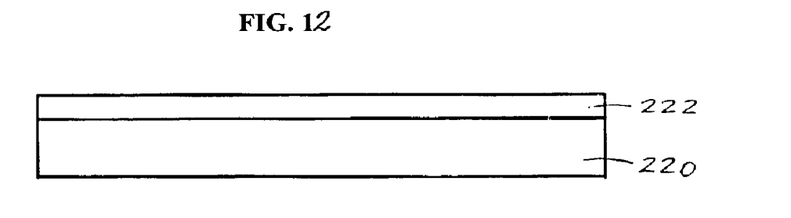
FIGS. 12–15 are side views illustrating a partial fabrication of the MEMS device of FIG. 4 in accordance with another embodiment of the invention.
Figure 13:
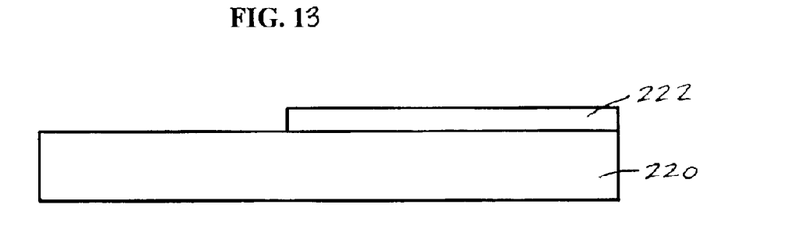
Figure 14:
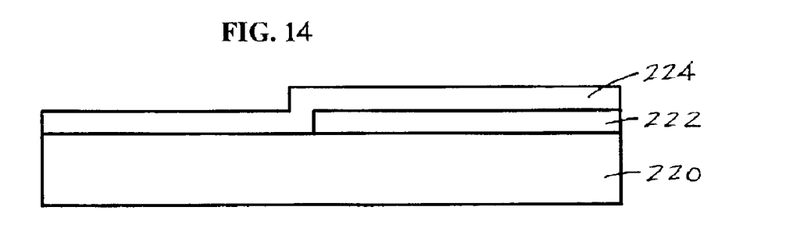
Figure 15:
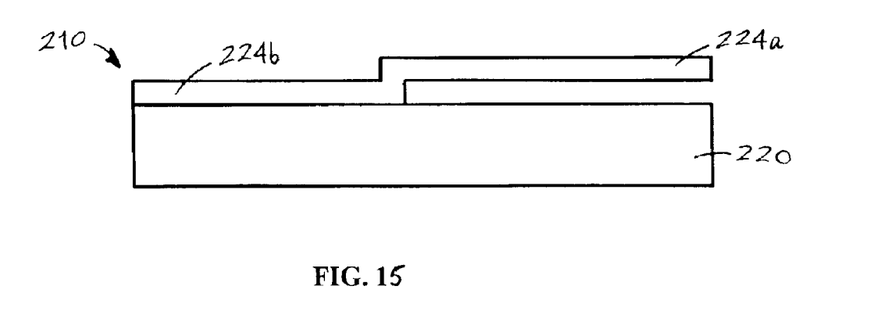

Although a timed etch of the sacrificial layer 222 has been described as one process for creating the free-standing support layer 224a, this is not the only method that may be used to create a cantilevered support layer. FIGS. 12–15 illustrate an alternative fabrication process for the MEMS device 210. The MEMS device begins with the overlaying of the sacrificial layer 222 over the support substrate 220 (FIG. 12). The sacrificial layer 222 is then subjected to a partial etch which removes a portion of the sacrificial layer (FIG. 13). Then, as illustrated in FIG. 14, the structural layer 224 is overlain over the support substrate 220 and the sacrificial layer 222. An optical element, such as a mirror, may be fabricated on the structural layer 224 in the manner described above. Finally, an etch is used to remove the remaining sacrificial layer 222 to create the free-standing support layer 224a and the structural support layer 224b.

The MEMS device illustrated in and described with reference to FIGS. 4–15 offers a variety of benefits. One benefit is protection against thin-film stress that causes mirror curvature. Further, the illustrated MEMS device allows low voltage operation which increases reliability while concurrently lowering costs of manufacture and operation.

Further, a monolithic process may be utilized to fabricate such MEMS devices, which eliminates the need for complicated and expensive flip chip bonding. A monolithic process as described above may greatly increase the alignment accuracy between the optical device, such as a mirror, and the driver electronics.

The design of the MEMS devices of the invention conserves space, allowing such MEMS devices to be packed efficiently on a substrate. The design also ensures adequate contact between the flexible layer 218 and the adjacent structural support layer 224b and the free-standing support layer 224a. The creation of a more compliant flexible layer 218 through the described and illustrated process opens up the design space. Specifically, the flexible layer 218 may be made thin enough to allow for the fabrication of a greater number and variety of MEMS device designs. For example, a MEMS device which requires a soft spring and which is fabricated conventionally would require a spring which his thin and long. Such a spring is difficult to fabricate via conventional lithography and etching. However, by depositing a thin film as described above, such a soft spring may be more easily and more accurately fabricated. Furthermore, using thin film deposition, smaller surface areas for the optical device may be utilized, allowing devices with smaller electrode surface areas to be activated. This in turn allows for closer packing of such MEMS devices.

Also, the low stiffness of the flexible layer 218, caused by the thinness of the flexible layer, permits actuation of the mirror 242 using lower voltages than for conventional MEMS devices. Also, by controlling the thickness of the flexible layer 218 to a high degree of accuracy during film deposition, the sensitivity of the structure to film thickness is minimized. Since thickness dominates the stiffness of the flexible layer 218, optical devices such as mirrors 242 can be designed such that their lateral dimensions are large enough that errors during fabrication have a negligible effect on their performance.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A MEMS device, comprising:
   a support member comprising a structural support layer attached to a polymer semiconductor support substrate through an intermediate layer, wherein said member is dimensioned to enable flex of said member about an axis of rotation in a first direction while maintaining stiffness in two directions orthogonal to the first direction;
   an optical device adapted to be electrostatically actuated and having an optical device support layer, wherein said support layer comprises polysilicon; and
   a member dimensioned to be flexible and interconnecting said support member and said optical device support layer, wherein said member is formed separately from said optical device support layer.

2. The MEMS device of claim 1, wherein said member is adapted to flex at a location within the same plane as said optical device.

3. The MEMS device of claim 1, further comprising driver electronics fabricated on said support substrate.

4. The MEMS device of claim 3, wherein said member enables flex of said optical device in a direction toward and away from said driver electronics.

5. The MEMS device of claim 1, wherein said intermediate layer comprises an oxide.

6. The MEMS device of claim 1, wherein said member comprises one or more materials from a group consisting of silicon nitride, titanium nitride, polysilicon, silicon carbide, metallic film, diamond and diamond-like carbon.

7. The MEMS device of claim 1, wherein said optical device comprises a coating including aluminum on said support layer.

8. The MEMS device of claim 1, wherein said optical device comprises a mirror.

9. A MEMS device, comprising:
a support substrate;
a structural support layer, wherein said support layer is free-standing and is in contact with said support substrate; and
an optical device adapted to be electrostatically actuated and having a support layer, wherein said support layer and said structural support layer are integrally formed of the same material and are deposited over said support substrate.

10. The MEMS device of claim 9, further comprising driver electronics on said support substrate.

11. The MEMS device of claim 10, wherein said support layer is adapted to flex in a direction toward and away from said driver electronics.

12. The MEMS device of claim 9, wherein said support substrate comprises silicon.

13. The MEMS device of claim 9, wherein said support layer comprises polysilicon.

14. The MEMS device of claim 9, wherein said optical device comprises a mirror.

15. A method for fabricating a MEMS device, comprising:
forming a support substrate;
forming a structural support layer; and
forming an optical device adapted to be electrostatically actuated and having a support layer, wherein said support layer and said structural support layer are integrally formed of the same material and are deposited over the support substrate, and wherein said forming an optical device comprises forming the support layer to be free-standing over said support substrate and forming said structural support layer to be in contact with said support substrate.

16. The method of claim 15, wherein said step of forming an optical device further comprises:
depositing an intermediate layer over said support substrate;
partially etching the intermediate layer;
depositing said support layer and said structural support layer such that said structural support layer contacts said support substrate and said support layer contacts said intermediate layer; and
removing the remaining intermediate layer.

17. A MEMS device, comprising:
a support member;
an optical device adapted to be electrostatically actuated and having an optical device support layer, wherein said support layer comprises polysilicon; and
a member dimensioned to be flexible and interconnecting said support member and said optical device support layer, wherein said member is formed separately from said optical device support layer.

18. A MEMS device, comprising:
a support member, said support member further comprising a structural support layer attached to a semiconductor support substrate through an intermediate layer, said support substrate further comprising quartz, wherein said substrate is dimensioned to enable flex of said substrate about an axis of rotation in a first direction while maintaining stiffness in two directions orthogonal to the first direction;
an optical device adapted to be electrostatically actuated and having an optical device support layer; and
a member dimensioned to be flexible and interconnecting said support member and said optical device support layer, wherein said member is formed separately from said optical device support layer.

19. A MEMS device, comprising:
a support substrate, wherein said support substrate comprises a polymer;
a structural support layer; and
an optical device adapted to be electrostatically actuated and having a support layer, wherein said support layer and said structural support layer are integrally formed of the same material and are deposited over said support substrate.

20. A MEMS device, comprising:
a support substrate, wherein said support substrate comprises quartz;
a structural support layer; and
an optical device adapted to be electrostatically actuated and having a support layer, wherein said support layer and said structural support layer are integrally formed of the same material and are deposited over said support substrate.

21. A method for fabricating a MEMS device, comprising:
forming a support substrate;
fabricating driver electronics on said support substrate;
forming a structural support layer; and
forming an optical device adapted to be electrostatically actuated and having a support layer, wherein said support layer and said structural support layer are integrally formed of the same material and are deposited over the support substrate.

22. The method of claim 21, wherein said support layer is adapted to flex in a direction toward and away from said driver electronics.

23. A MEMS device, comprising:
a support member comprising a structural support layer attached to a silicon semiconductor support substrate through an intermediate layer, wherein said member is dimensioned to enable flex of said member about an axis of rotation in a first direction while maintaining stiffness in two directions orthogonal to the first direction;
an optical device adapted to be electrostatically actuated and having an optical device support layer, wherein said support layer comprises polysilicon; and
a member dimensioned to be flexible an interconnecting said support member and said optical device support layer, wherein said member is formed separately from said optical device support layer.

* * * * *